United States Patent Office 3,283,178
Patented Nov. 1, 1966

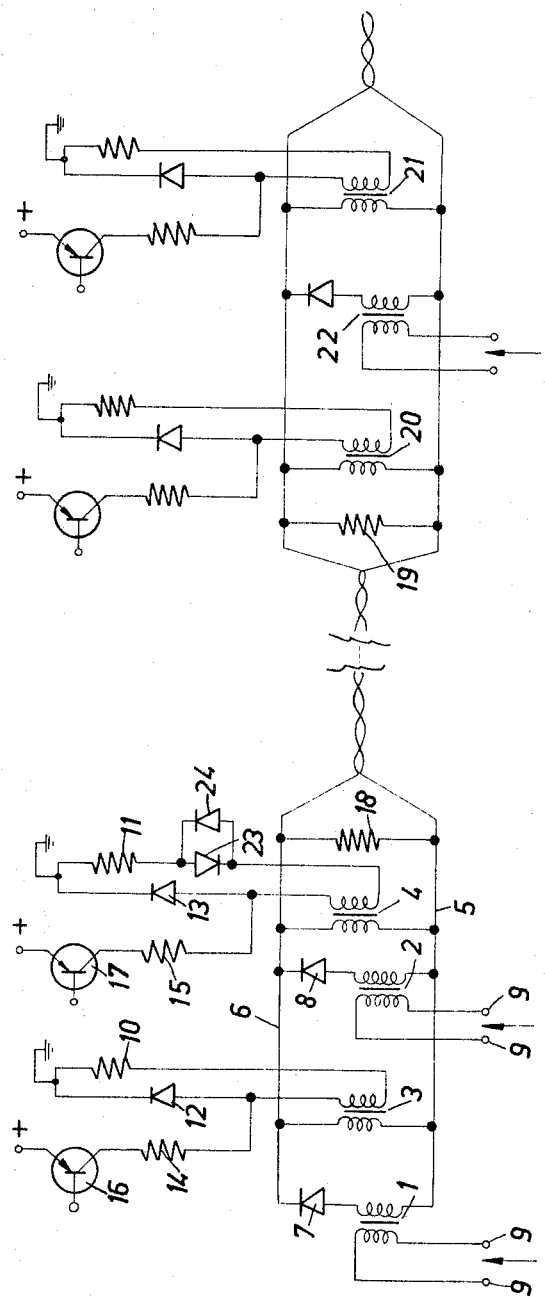

3,283,178
PULSE TRANSMISSION CIRCUIT
Heinz E. Voigt, Konstanz, Germany, assignor to Telefunken Patentverwertungsgesellschaft m.b.H., Ulm (Danube), Germany
Filed Oct. 8, 1964, Ser. No. 402,555
Claims priority, application Germany, Oct. 9, 1963, T 24,856
13 Claims. (Cl. 307—88.5)

The present invention relates to a circuit arrangement incorporating a two-wire transmission line for purposes of pulse distribution having at least one input transformer and two or more switchable output transformers, the primary windings of the output transformers and the secondary windings of the input transformers being connected, in parallel with each other, to the transmission line.

For purposes of pulse distribution from a pulse transmitter to one or more pulse receivers, there exist matrix-type arrangements at whose matrix points there are transformers whose two primary winding terminals are connected to the line and column wires, respectively. By selecting one line and one column of the matrix, the common pulse transmitter is switched through to the transformer which is connected to the intersection of the selected line and column. For this purpose, rectifiers are connected at the matrix points in series with the primary windings of the transformer, which rectifiers are controllable by applying a suitable potential to the line and column wires, such that the recifiers can be made conductive or non-conductive.

Such an arrangement has certain limitations insofar as the size of the matrix and the operating speed are concerned. When a switching potential for the rectifiers is applied, the charge on entire line (or column) wires has to be changed; this, due to the fact that the lead capacitance can not be considered as being negligible, can not be brought about as quickly as one would desire. The longer the line and column wires are, the more will the operating speed be limited. If, in a larger piece of equipment, the pulse transmitter and receiver are spatially separated an appreciable distance from each other, the above-described arrangement will no longer be suited for purposes of pulse distribution and transmission at high speed.

It is, therefore, the primary object of the present invention to provide an arrangement which overcomes the above-described drawbacks, namely, to provide an arrangement by which a two-wire transmission system having at least one input and two or more output transformers, wherein the primary windings of the output transformers, and the secondary winding(s) of the input transformer(s) are connected in parallel with the transmission line, can be operated at very high speed. According to the present invention, this is accomplished by connecting the secondary winding of each output transformer in series with a rectifier, and by connecting each of the juncture points of the series-connection with a switch by means of which the rectifier is controlled so as to have a high or low conductivity, so that by adjusting the state of the switching means, the pulses passing through the transmission line can be switched through two selected receivers, Thus, the present invention is based upon the recognition of the fact that the speed can be substantially increased if the switching is no longer effected by changing the potential of long transmission lines, but instead, to make the secondary side of the transformers switchable. By fashioning the two conductors of the transmission lines symmetrically and by means of galvanic separation, the active and passive interference of the transformation will be reduced.

Additional objects and advantages of the present invention will become apparent upon consideration of the following description when taken in conjunction with the accompanying drawing in which the single figure is a circuit diagram of one embodiment of the present invention, it being apparent, however, that the circuitry may be modified in various ways, particularly insofar as the polarities are concerned.

Referring now to the drawing, the left half of the figure shows two input transformers 1 and 2 and two output transformers 3 and 4 which, in accordance with the present invention, are connected with the two conductor transmission lines incorporating the conductors 5 and 6. These conductors constitute so-called bus lines through which no direct current flows.

The secondary winding of each of the input transformers is connected in series with a decoupling rectifier 7 and 8, each series-circuit being connected across the two conductors 5 and 6, while the primary windings of the output transformers are connected directly across the two conductors 5 and 6. The terminals 9 of the primary windings are connected to pulse sources or so-called transmitters (not shown).

The pulse receivers are connected across the secondary windings of the output transformers and insofar as the transformers are concerned, constitute resistances. They can, however, be constituted by bistable register elements, such as pulse amplifiers or the like. Inasmuch as, insofar as the present invention is concerned, the details of the pulse receiver are of no consequence, the same are shown, in the drawing, simply as resistors 10 and 11. Each resistor has one terminal connected to a fixed potential, for example ground, while the other terminal is connected to the secondary winding of the respective output transformer. (The purpose of the parallel circuit composed of the two oppositely poled rectifiers 23, 24, shown as being connected between the resistor 11 and the secondary winding of transformer 4 will be explained below.) The second terminal of the secondary winding of each output transformer is connected by a rectifier 12, 13, with a fixed potential, for example, ground, and via a resistor 14, 15, with a switch by means of which a positive potential can be applied to the resistor. In the illustrated embodiment, each switch is constituted by a transistor 16, 17, whose base electrode is the controlled electrode and whose emitter electrode is connected with the potential which is to be switched through.

The secondary winding is preferably so poled that the working or signal pulse coming from the receiver and to be processed further controls the rectifier (for example, rectifier 13) in such a manner as to bring it into its region of lesser conductivity, so that the current of the signal pulse is subtracted from the switching current. In this way, the amplitude of the signal pulse is limited, so that by appropriately designing the resistance (for example, resistor 15) the receiver will be protected from excess current.

The potential at the juncture of the resistor and the rectifier will, due to the switching current which flows from the switch (for example, transistor 17) via the resistor (for example, resistor 15) and the rectifier (for example, rectifier 13), to ground, vary only by the small voltage drop across the rectifier in forward direction. The receiver is thus hardly affected at all by the switching. If the input circuit of the receiver already has an amplitude threshold, or if the receiver incorporates a non-linear element which constitutes a threshold, as shown, in the case of receiver 11, by the two oppositely poled parallely connected rectifiers 23 and 24, the receiver will take no notice at all of the switching process.

Further adverse effects of the pulse are suppressed, for example, by letting the receiver integrate the incoming pulse.

Inasmuch as no direct current flows through the two-wire line 5, 6, the present invention is particularly well suited for transmitting pulses over longer distances. In the case of such longer distances, the two conductors may, for example, lead to the circuit arrangement shown at the right of the figure. That section of the transmission line 5, 6, which is connected to the transformers and which is directed toward the long line section has a resistor 18 connected across it, the resistance of this resistor preferably being equal to the characteristic impedance of the long transmission line. A resistor 19 having the same resistance is connected across the other end of the long transmission line which, as shown at the right of the figure, itself can have a number of input and output transformers connected across it. The drawing shows two output transformers 20 and 21 and an input transformer 22. The circuitry of the components shown at the right of the figure is identical to that shown at the left so that a detailed description thereof is unnecessary.

The circuit shown in the drawing can be used for transmitting pulses from any transmitter to any receiver, irrespective of whether the same are connected to the same or to a different end of the line. Inasmuch as the transmission line does not act as a rectifier, pulses can be sent from a transmitter at the left side to a receiver on the right side, or from a transmitter at the right side to a receiver on the left side. Furthermore, the long section of the transmission line can be constituted by a plurality of sections, and each or some of these sections can have further transmitters and receivers connected thereto in the same manner as shown in the drawing.

The present invention is particularly suitable for the series transmission of intelligence from an active transmitter to a selected receiver. In order to transmit the intelligence in parallel, as is often required within a digital computer, a plurality of similarly constituted transmission lines can be switched through simultaneously. For this case, the switch, for example, the transistor 17, can be used simultaneously for the multiple switching action. Such an arrangement can thus serve as a bus line to which a plurality of electronic registers of the computer are connected.

It will be understood that the above description of the present invention is susceptible to various modifications, changes, and adaptations, and the same are intended to be comprehended within the meaning and range of equivalents of the appended claims.

What is claimed is:

1. A pulse transmission circuit arrangement comprising, in combination: two conductors; at least one input transformer and at least two output transformers, each transformer having a primary winding and a secondary winding, the secondary winding of said input transformer being connected across said two conductors and the primary windings of said output transformers each being connected across said two conductors; a plurality of rectifiers each connected in series-circuit with the secondary winding of a respective output transformer, each of said rectifiers and the respective secondary winding having a polarity such that a pulse to be applied to a load connected to a respective output transformer drives such rectifier toward its state of low conductivity; and a plurality of switch means each connected to a respective series-circuit at the juncture of the respective secondary winding and respective rectifier for controlling the state of conductivity of the respective rectifier, thereby to allow a pulse applied to said input transformer to be switched through to a load connected to any selected one of said output transformers and for simultaneously limiting the amplitude of the pulse which is switched through to the load.

2. A transmission circuit arrangement as defined in claim 1 wherein sections of said conductors together constitute a long transmission line, and wherein, at each end of said long transmission line, there is a resistor connected across said two conductors, each of said resistors having a resistance equal to the characteristic impedance of said long transmission line.

3. A transmission circuit arrangement as defined in claim 2 wherein there are a plurality of input transformers, there being at least one input transformer and at least one output transformer at each end of said long transmission line.

4. A transmission circuit arrangement as defined in claim 1 wherein each of said switching means comprises a transistor.

5. A transmission circuit arrangement as defined in claim 1 wherein said switching means comprise a transistor and a resistor connected in series-circuit, which last-mentioned series-circuit is connected to said juncture, said resistor having a large resistance for limiting the current applied to the load connected to the respective output transformer.

6. A transmission circuit arrangement as defined in claim 1 wherein a receiver is connected to the secondary winding circuit of each output transformer.

7. A transmission circuit arrangement as defined in claim 6 wherein said receiver has an amplitude threshold.

8. A transmission circuit arrangement as defined in claim 7 wherein said amplitude threshold is constituted by two parallely connected oppositely poled rectifiers.

9. A transmission circuit arrangement as defined in claim 6 wherein said receiver integrates the incoming pulse.

10. A multiple transmission circuit arrangement incorporating a plurality of circuit arrangements each as defined in claim 1, said circuit arrangements being connected in parallel to constitute a multiple channel for the parallel transmission of data.

11. A multiple transmission circuit arrangement as defined in claim 10 wherein at least one of said switch means is common to a plurality of said circuit arrangements.

12. A transmission circuit arrangement as defined in claim 1 wherein said secondary winding of said input transformer is connected in series-circuit with a further rectifier, said last-mentioned series-circuit being connected across said two conductors.

13. A transmission circuit arrangement comprising, in combination:
 (a) two conductors;
 (b) at least one input transformer having a primary winding connected to a transmitter which produces pulses to be transmitted and a secondary winding connected in series-circuit with a rectifier, said series-circuit being connected across said two conductors;
 (c) at least two output transformers, each having a primary winding connected across said two conductors and a secondary winding connected in series-circuit with a further rectifier, said last-mentioned series-circuit being connected to a receiver for receiving pulses produced by said transmitter, said secondary winding and said further rectifier being connected with such a polarity that a pulse to be applied to the receiver drives such rectifier towards its state of low conductivity; and
 (d) a plurality of switching means, corresponding in number to the number of output transformers, there being one switching means associated with each output transformer, each switching means comprising a transistor and a resistor connected in series-circuit therewith, said last-mentioned series-circuit being connected to the juncture of the respective secondary winding and the respective further rectifier for controlling the state of conductivity of the last-mentioned rectifier, thereby to allow a pulse passing through said two conductors to be switched through to any of the receivers and for simultaneously limiting the amplitude of such pulse switched through to a receiver.

References Cited by the Examiner

UNITED STATES PATENTS

| | | | |
|---|---|---|---|
| 2,085,434 | 6/1937 | Loftis et al. | 333—8 X |
| 2,229,043 | 1/1941 | Butler. | |
| 2,363,062 | 11/1944 | Hartley | 179—15 |
| 2,877,451 | 3/1959 | Williams. | |
| 3,046,415 | 7/1962 | Winslow | 307—88.5 |
| 3,117,241 | 1/1964 | Paynter et al. | 307—88.5 |
| 3,135,873 | 6/1964 | Werme | 307—88.5 |
| 3,158,692 | 11/1964 | Gerkensmeier. | |

OTHER REFERENCES

Reintjes and Coate: Principle of Radar (textbook), third edition, McGraw-Hill, 1952, pages 145 and 146.

ARTHUR GAUSS, *Primary Examiner.*

I. C. EDELL, *Assistant Examiner.*